(12) United States Patent
Ohseki et al.

(10) Patent No.: US 9,036,565 B2
(45) Date of Patent: May 19, 2015

(54) RADIO FRAME CONTROL DEVICE, RADIO COMMUNICATION DEVICE, AND RADIO FRAME CONTROL METHOD

(75) Inventors: Takeo Ohseki, Fujimino (JP); Satoshi Konishi, Fujimino (JP); Toshihiko Komine, Fujimino (JP)

(73) Assignee: KDDI Corporation, Tokyo (JP)

( * ) Notice: Subject to any disclaimer, the term of this patent is extended or adjusted under 35 U.S.C. 154(b) by 1193 days.

(21) Appl. No.: 12/614,725

(22) Filed: Nov. 9, 2009

(65) Prior Publication Data

US 2010/0118814 A1    May 13, 2010

(30) Foreign Application Priority Data

Nov. 11, 2008  (JP) ............... P2008-288622

(51) Int. Cl.
*H04W 4/00* (2009.01)
*H04L 5/00* (2006.01)
*H04W 72/04* (2009.01)

(52) U.S. Cl.
CPC ............ *H04L 5/0041* (2013.01); *H04L 5/0039* (2013.01); *H04W 72/04* (2013.01)

(58) Field of Classification Search
CPC ............................. H04W 72/04; H04L 47/00
USPC ................................................. 370/329, 468
See application file for complete search history.

(56) References Cited

U.S. PATENT DOCUMENTS

2007/0177543 A1* 8/2007 Qian et al. ................... 370/330
2007/0189197 A1* 8/2007 Kwon et al. .................. 370/319
2009/0086673 A1* 4/2009 Aminaka et al. ............. 370/329
2009/0135850 A1* 5/2009 Hong et al. ................... 370/468
2009/0170442 A1* 7/2009 Asanuma et al. .......... 455/67.11

FOREIGN PATENT DOCUMENTS

WO       2008/105419 A1     9/2008

OTHER PUBLICATIONS

3GPP Standards, 3GPP TS 36.213 V8.4.0 Evolved Universal Terrestrial Radio Access (E-UTRA) Physical Layer Procedures; Release 8, all pages.*
3GPP TS 36.211 V8.2.0 (Mar. 2008) "3rd Generation Partnership Project; Technical Specification Group Radio Access Network; Evolved Universal Terrestrial Radio Access (E-UTRA); Physical Channels and Modulation (Release 8)".
Japanese Office Action and English translation issued on Dec. 4, 2012 in corresponding Japanese Patent Application No. 2008-288622.

* cited by examiner

*Primary Examiner* — Brandon Renner
(74) *Attorney, Agent, or Firm* — Morgan, Lewis & Bockius LLP (57) ABSTRACT

A radio frame control device comprises a controlling unit, a resource block allocation unit, and a resource block conversion unit. The controlling unit controls a downlink radio frame of an orthogonal frequency division multiple access scheme. The resource block allocation unit allocates resource blocks to a terminal station using any one of a plurality of resource block allocation methods respectively having different restrictions. The resource block conversion unit determines whether or not conversion is possible from allocation information of resource blocks allocated according to a first resource block allocation method into resource block allocation information by a second resource block allocation method. The resource block conversion unit converts the resource block allocation method for the resource block allocation information when the conversion is possible.

10 Claims, 11 Drawing Sheets

ALLOCATION TYPE 0: EXPRESSION OF RB ALLOCATION INFORMATION TO UE BY BITMAP INFORMATION OF RBG UNIT

CASE OF SYSTEM BANDWIDTH=10[MHz]
⇨ RBG SIZE=3[RB]

ALLOCATION TO UE IS MADE IN RBG UNIT.

$N_{RB}$=50

▨ RB PAIR ALLOCATED TO $UE_0$ ⇨ INFORMATION OF RESOURCE BLOCK ASSIGNMENT PLACED ON DCI FOR $UE_0$ (10001010000000100)

▦ RB PAIR ALLOCATED TO $UE_1$ ⇨ INFORMATION OF RESOURCE BLOCK ASSIGNMENT PLACED ON DCI FOR $UE_1$ (00110000011100000)

REQUIRED NO. OF BITS IS $\lceil N_{RB}^{DL}/P \rceil = \lceil 50/3 \rceil = 17$ bits

EXAMPLE OF RB ALLOCATION TO TERMINAL STATION BY ALLOCATION TYPE 0

ALLOCATION TYPE 2 (DISTRIBUTED): DESIGNATION OF ALLOCATION START RB ON VRB AND RB TO BE CONTINUOUSLY RESERVED FOR UE THEREFROM. THEREAFTER, MAPPING ONTO PRB BY PERFORMING INTERLEAVE.

(1) ALLOCATION ONTO VIRTUAL RESOURCE BLOCK

IT IS ASSUMED THAT 4VRB-PAIR FROM ID 0 IS ALLOCATED $N'_{RB} = 46$

AREA WHERE ALLOCATION IS IMPOSSIBLE (2) INTERLEAVE ACCORDING TO INTERLEAVE PATTERN

INTERLEAVE PATTERN
- NO. OF COLUMNS=4
- NO. OF ROWS=CEILING($N'_{RB}$/(4P))×P
- NO. OF NULLS=(NO. OF ROWS)×(NO. OF COLUMNS)−$N'_{RB}$
- NULL IS ARRANGED IN 2nd AND 4th COLUMNS

N:NULL

REVERSE WITHIN PAIR (3) MAPPING ACCORDING TO $N_{Gap}$ $N_{Gap} = 27$

AREA WHERE ALLOCATION IS IMPOSSIBLE IN DISTRIBUTED TYPE

EXAMPLE OF RB ALLOCATION TO TERMINAL STATION BY ALLOCATION TYPE 2 (DISTRIBUTED)

RADIO FRAME CONTROL DEVICE, RADIO COMMUNICATION DEVICE, AND RADIO FRAME CONTROL METHOD

BACKGROUND OF THE INVENTION

1. Field of the Invention

The present invention relates to a radio frame control device, a radio communication device, and a radio frame control method.

Priority is claimed on Japanese Patent Application No. 2008-288622, filed Nov. 11, 2008, the content of which is incorporated herein by reference.

2. Description of Related Art

In recent years, "LTE (Long Term Evolution)" has been known, for example, as one of the 3GPP (Third Generation Partnership Project) standards as a next-generation mobile communication scheme to realize high-speed, broadband radio communication (for example, see 3GPP TS 36.211, "Evolved Universal Terrestrial Radio Access (E-UTRA): Physical channels and modulation"). The LTE uses OFDMA (Orthogonal Frequency Division Multiple Access) as a downlink radio transmission scheme (link from a base station to a terminal station). The OFDMA scheme is a multicarrier transmission scheme for performing communication using a broadband signal configured from a plurality of subcarriers of which frequencies are orthogonal to each other, and realizes multiple access between one base station and a plurality of users using a different subcarrier for every user (terminal station).

Figure 8:
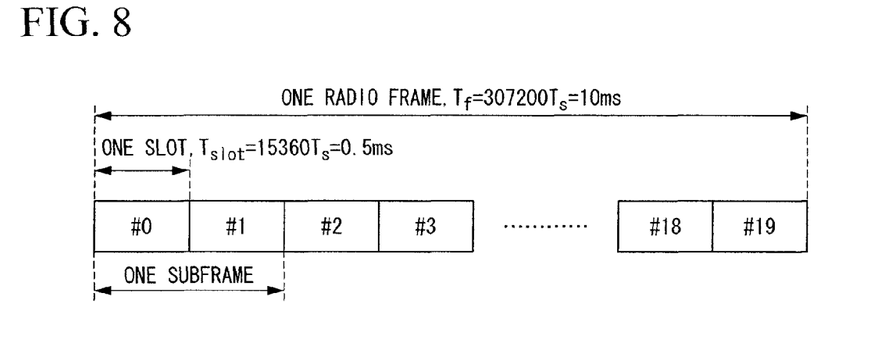
FIG. 8 is a diagram showing a configuration example of a downlink radio frame of an OFDMA scheme.
Figure 9:
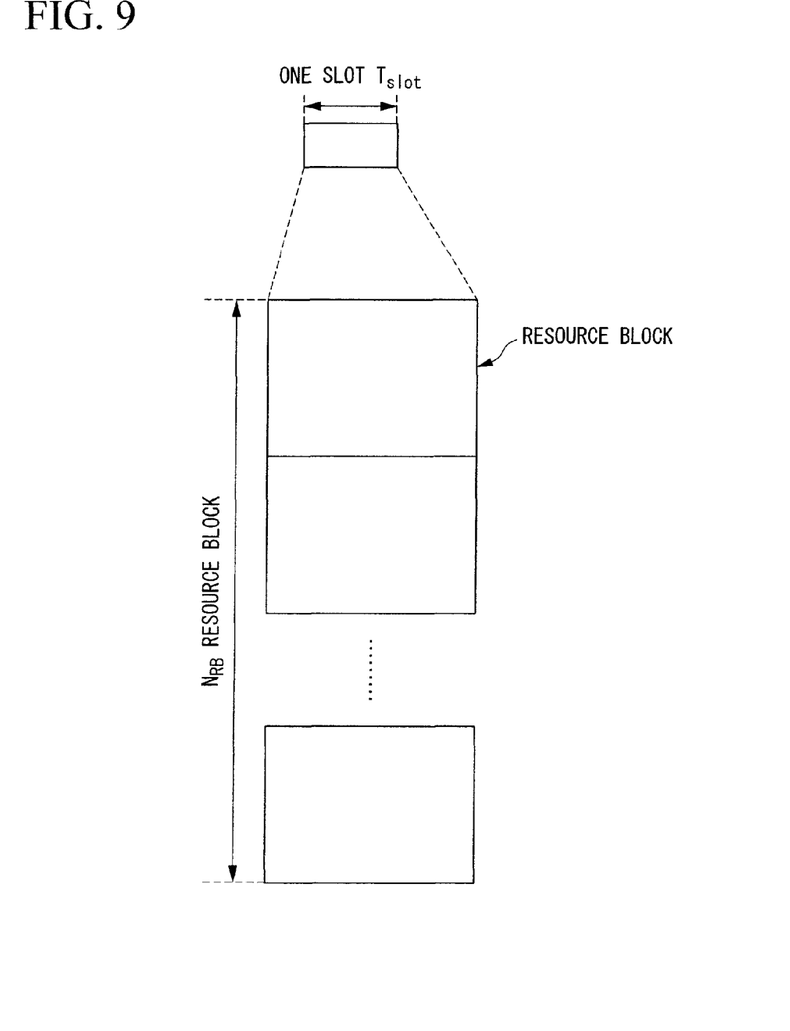
FIG. 9 is a conceptual diagram showing a slot configuration within a radio frame shown in FIG. 8.

FIG. 8 is a diagram showing a configuration example of a downlink radio frame of the OFDMA scheme. A radio frame shown in FIG. 8 is based on the LTE. In FIG. 8, one radio frame is configured from a plurality of subframes. One subframe is configured from two slots. As shown in FIG. 9, one slot has a configuration in which resource blocks (RBs) are connected in a frequency direction. For example, when a subcarrier interval is 15 kHz, one RB may be configured by either "12 Subcarriers in Frequency Direction×7 OFDMA Symbols in Time Direction" or "12 Subcarriers in Frequency Direction×6 OFDMA Symbols in Time Direction". In the OFDMA scheme, the arrangement information indicating an RB where a packet destined for each user is arranged within a subframe is determined for every subframe. A transmitter of the base station determines a radio resource to be used to transmit a downlink packet according to the arrangement information. A receiver of each terminal station receives a packet for a local station within a subframe according to the arrangement information.

In the LTE, four allocation types 0, 1, 2 (localized), and 2 (distributed) are defined as a method of allocating RBs to a terminal station in a subframe (for example, see 3GPP TS 36.213, "Evolved Universal Terrestrial Radio Access (E-UTRA): Physical channels and modulation"). Different restrictions are provided in the allocation types. When RBs are allocated to the terminal station, they must be allocated to the terminal station under the restrictions according to any one of the allocation types. Now, each allocation type will be described briefly.

[Allocation Type 0]

Figure 10:
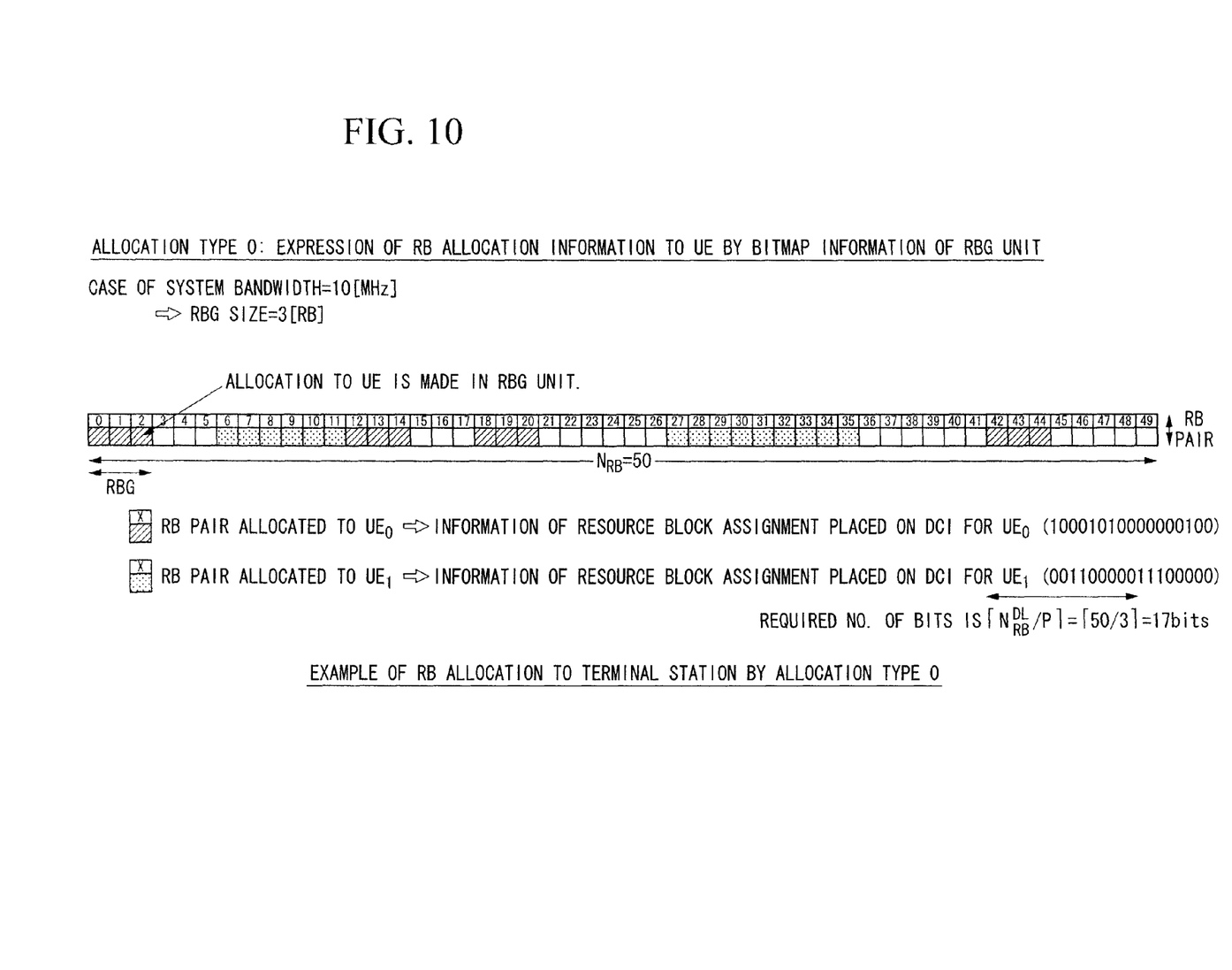
FIG. 10 is an example of RB allocation to a terminal station by an allocation type 0 of LTE.

In the allocation type 0, RBs are allocated to a terminal station in a unit of a resource block group (RBG). The resource block group is configured from a plurality of RBs continuous on a frequency axis. In the example of FIG. 10, the RBG is configured from three continuous RBs on the frequency axis, and the RBs are allocated to the terminal station in the RBG unit.

[Allocation Type 1]

Figure 11:
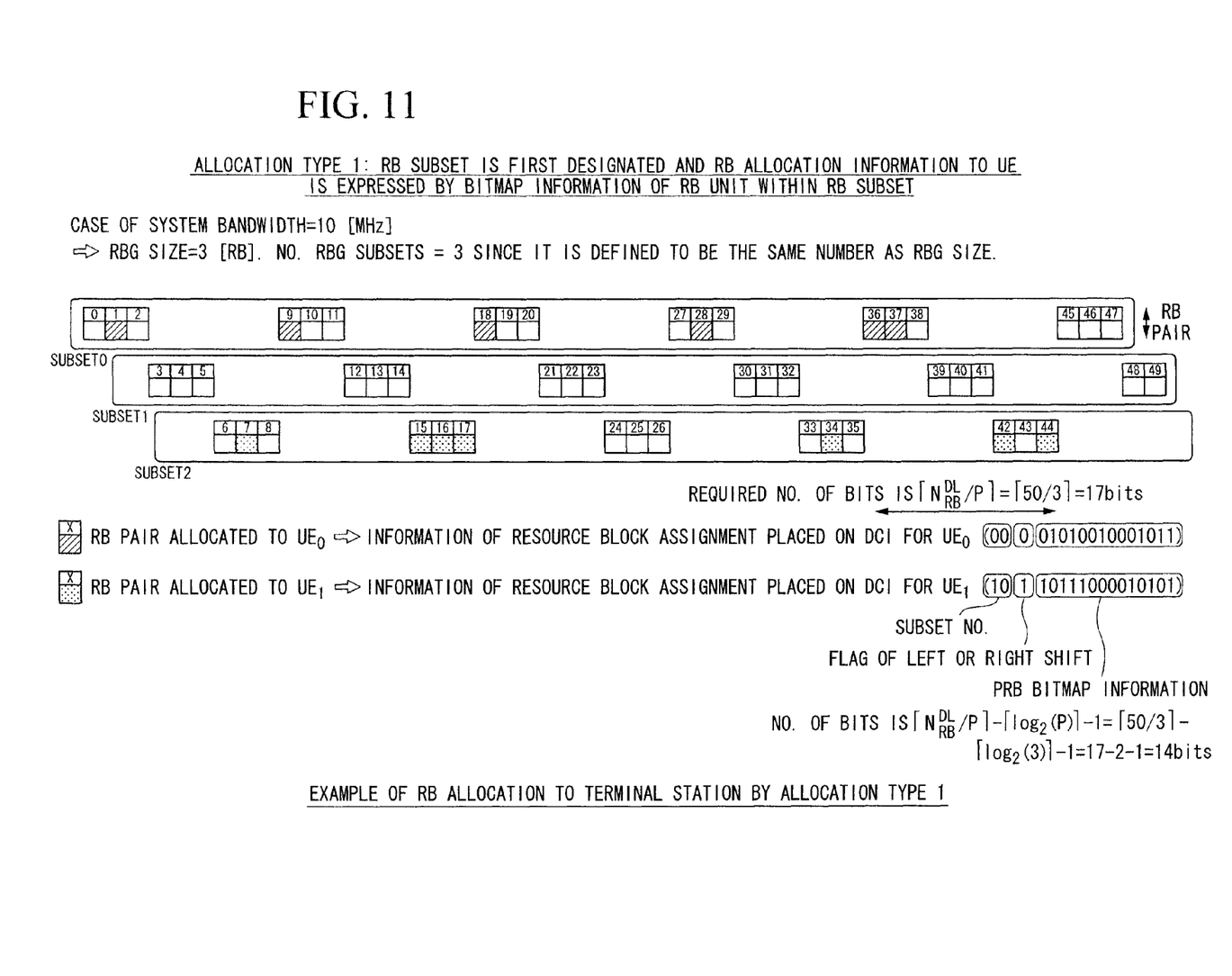
FIG. 11 is an example of RB allocation to a terminal station by an allocation type 1 of LTE.

In the allocation type 1, RBs are allocated to the terminal station in an RB unit for the same subset. In the example of FIG. 11, three subsets (the number of subsets is the same as the RBG size) are provided and the RBs are allocated to the same terminal station in the RB unit for the same subset. In each subset, the RBs are sequentially arranged in the RBG unit.

[Allocation Type 2 (Localized)]

Figure 12:
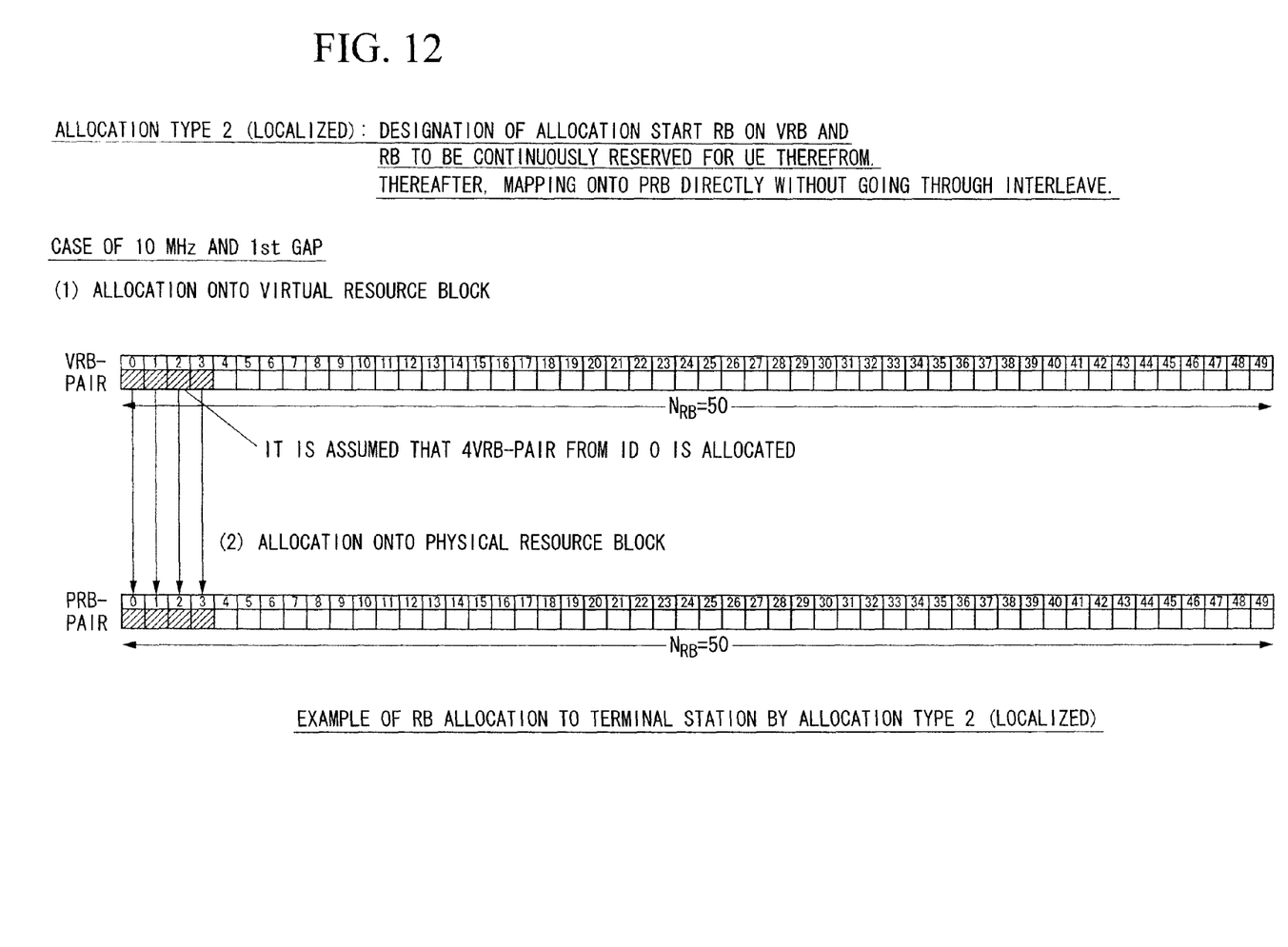
FIG. 12 is an example of RB allocation to a terminal station by an allocation type 2 (localized) of LTE.

In the allocation type 2 (localized), RBs are allocated to a terminal station in the RB unit on a logical frequency axis. In this regard, all RBs allocated to the same terminal station need to be continuous on the frequency axis. As illustrated in FIG. 12, mapping is performed on a physical frequency axis to be exactly the same as the logical frequency axis. According to the allocation type 2 (localized), only the start and end points of RB allocation may be represented on the logical frequency axis and the amount of RB allocation information to be reported to the terminal station may be reduced.

[Allocation Type 2 (distributed)]

Figure 13:
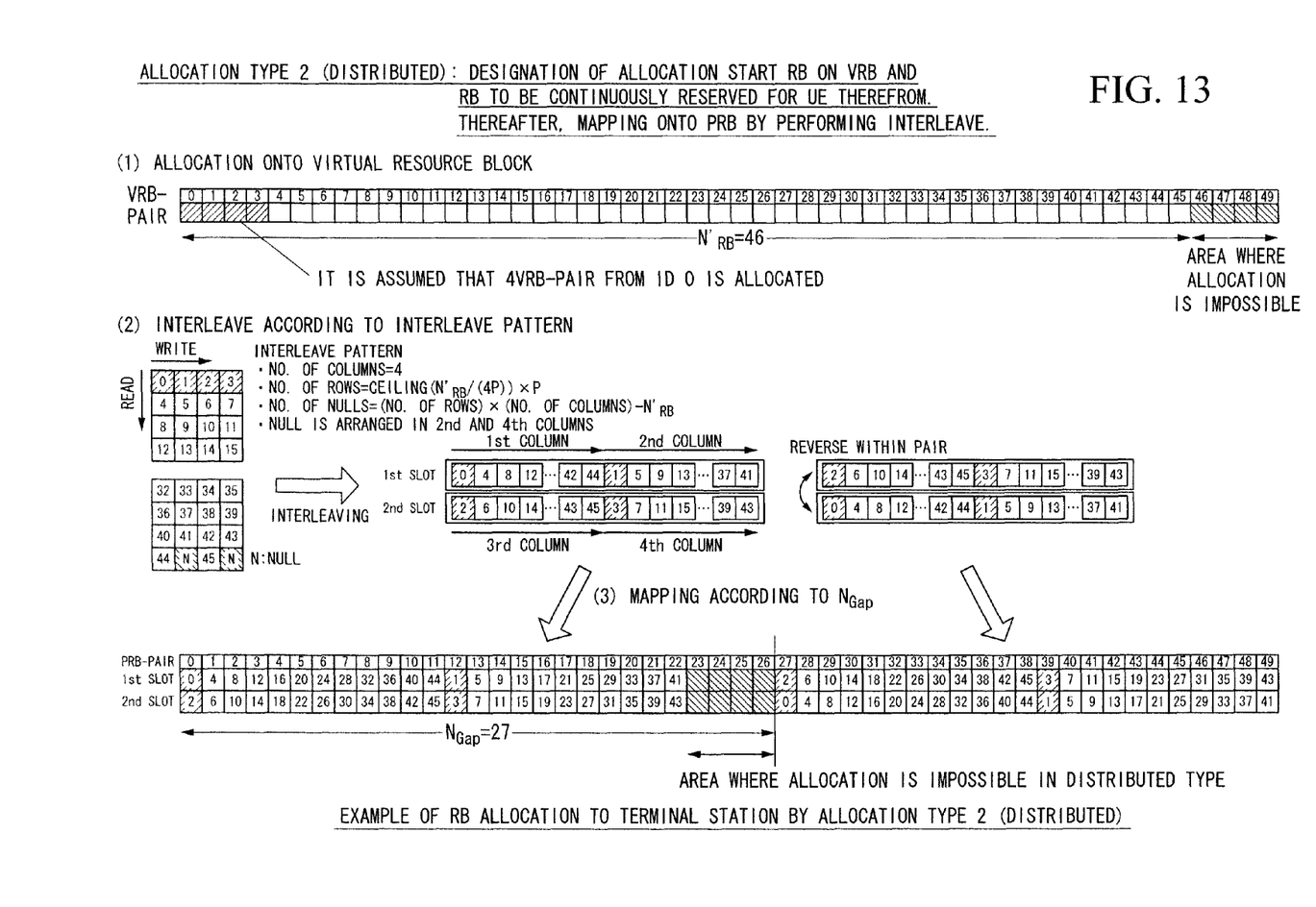
FIG. 13 is an example of RB allocation to a terminal station by an allocation type 2 (distributed) of LTE.

In the allocation type 2 (distributed), RBs are allocated to a terminal station in the RB unit on the logical frequency axis. In this regard, all RBs allocated to the same terminal station need to be continuous on the frequency axis. As illustrated in FIG. 13, mapping is made in a predetermined pattern on the physical frequency axis.

SUMMARY

In one aspect of the present invention, there is provided a radio frame control device that includes at least: a controlling unit which controls a downlink radio frame of an orthogonal frequency division multiple access scheme; a resource block allocation unit which allocates resource blocks to a terminal station using any one of a plurality of resource block allocation methods respectively having different restrictions; and a resource block conversion unit which determines whether or not conversion is possible from allocation information of resource blocks allocated according to a first resource block allocation method into resource block allocation information by a second resource block allocation method, and converts the resource block allocation method for the resource block allocation information when the conversion is possible.

Moreover, in another aspect, there is provided a radio communication device of an orthogonal frequency division multiple access scheme, that includes at least: the above-described radio frame control device; and an OFDMA transmitting unit which arranges a transmission packet addressed to each terminal station for resource blocks within a radio frame according to resource block allocation information for each terminal station determined by the radio frame control device.

In addition, in still another aspect, there is provided a radio frame control method that includes at least: controlling a downlink radio frame of an orthogonal frequency division multiple access scheme; allocating first resource block to a terminal station using a first resource block allocation method among a plurality of resource block allocation methods respectively having different restrictions; determining whether or not conversion is possible from allocation information of a resource block allocated according to the first resource block allocation method into resource block allocation information by a second resource block allocation method; and converting the resource block allocation method for the resource block allocation information when the conversion is possible.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Hereinafter, an embodiment of the present invention will be described with reference to the drawings.

Figure 1:
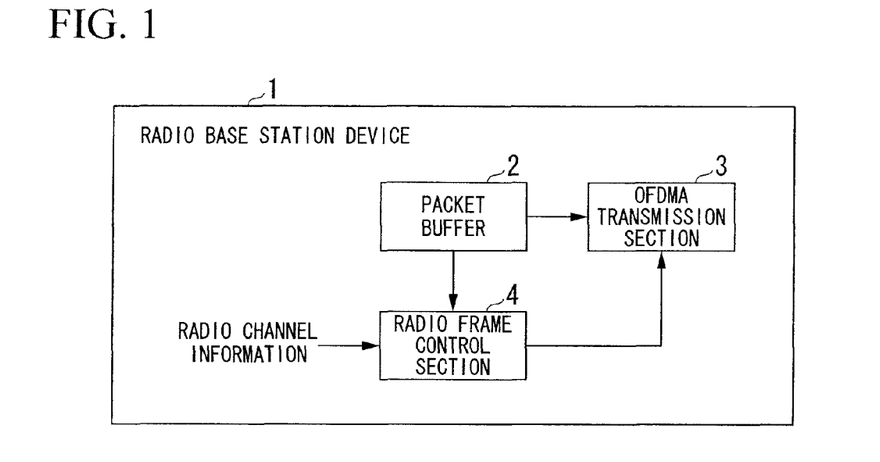
FIG. 1 is a block diagram showing a schematic configuration of a radio base station device 1 of an OFDMA scheme according to one embodiment of the present invention.

FIG. 1 shows a schematic configuration of a radio base station device 1 of an OFDMA scheme according to one embodiment of the present invention. In FIG. 1, there is shown a schematic configuration related to a downlink transmission (link from a base station to a terminal station).

In FIG. 1, the radio base station device 1 has a packet buffer 2, an OFDMA transmission section 3, and a radio frame control section 4. The packet buffer 2 temporarily accumulates a packet to be transmitted to each terminal station. The OFDMA transmission section 3 arranges the packet to be transmitted to each terminal station in a resource block (RB) within a radio frame by the OFDMA scheme and wirelessly transmits the packet. The radio frame control section 4 determines an RB to be allocated to each terminal station, and provides the OFDMA transmission section 3 with RB allocation information indicating which RB has been allocated to which terminal station, for every radio frame. The OFDMA transmission section 3 arranges a transmission packet addressed to each terminal station for an RB within a radio frame according to the RB allocation information.

The radio frame control section 4 uses transmission packet information or radio channel information for RB allocation for a terminal station. The transmission packet information includes the packet amount accumulated in the packet buffer 2 and the size of each packet for every destination terminal station. The radio channel information is information indicating a downlink radio channel state. A CQI (Channel Quality Indicator) signal may be used.

The radio frame control section 4 performs RB allocation to the terminal station using one of allocation types 0, 1, 2 (localized), and 2 (distributed) based on LTE.

Figure 2:
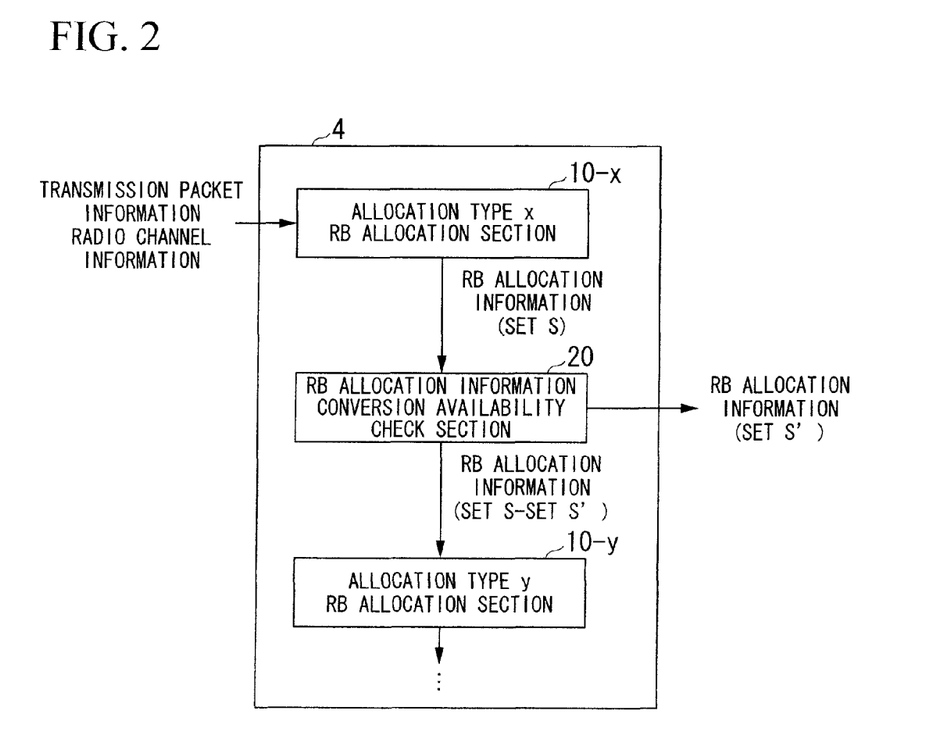
FIG. 2 is a block diagram showing a configuration of a radio frame control section 4 according to the same embodiment.

FIG. 2 is a block diagram showing a configuration of the radio frame control section 4 according to this embodiment. In FIG. 2, the radio frame control section 4 has a plurality of RB allocation sections 10 by different allocation types and an RB allocation information conversion availability check section 20.

In FIG. 2, there is illustrated an RB allocation section ("allocation type x allocation section") 10-$x$ for an allocation type x and an RB allocation section ("allocation type y allocation section") 10-$y$ for an allocation type y. The allocation type x allocation section 10-$x$ performs RB allocation to the terminal station according to the allocation type x. The allocation type y allocation section 10-$y$ performs RB allocation to the terminal station according to the allocation type y.

Each RB allocation section 10 selects an RB to be allocated to the terminal station from among available RBs on the basis of transmission packet information or radio channel information. The transmission packet information may be used to determine how many RBs are allocated to a terminal station of an RB allocation destination. The radio channel information may be used to determine how much data can be transmitted for every RB to a terminal station of an RB allocation destination.

The RB allocation information conversion availability check section 20 determines whether or not the conversion is possible from allocation information of RBs according to a certain allocation type into another allocation type, and performs the conversion of the allocation type for the RB allocation information when the conversion is possible.

Next, the operation of the radio frame control section 4 shown in FIG. 2 will be described.

First, the allocation type x allocation section 10-$x$ selects an RB to be allocated to the terminal station among available RBs according to the allocation type x on the basis of transmission packet information or radio channel information for every terminal station. The allocation type x allocation section 10-$x$ provides the RB allocation information conversion availability check section 20 with RB allocation information (set S) including the selection result. The RB allocation information (set S) includes all available RB information elements, and includes RB allocation information allocated according to the allocation type x.

Subsequently, the RB allocation information conversion availability check section 20 determines whether or not the conversion is possible from allocation information of RBs allocated according to the allocation type x in the RB allocation information (set S) into the allocation type y for every terminal station.

When conversion into the allocation type y is impossible as the determination result, the RB allocation information conversion availability check section 20 extracts terminal station-related RB allocation information incapable of being converted into the allocation type y from allocation information of RBs allocated according to the allocation type x in the RB allocation information (set S), and includes the extracted allocation information in RB allocation information (set S'). The RB allocation information conversion availability check section 20 outputs the RB allocation information (set S'). The RB allocation information (set S') is configured from allocation information of RBs allocated according to the allocation type x. The RB allocation information conversion availability check section 20 deletes the RB allocation information (set S') from the RB allocation information (set S).

On the other hand, when the conversion into the allocation type y is possible, the RB allocation information conversion availability check section 20 converts RB allocation information related to the terminal station, which is capable of being converted into the allocation type y and is allocated according to the allocation type x in the RB allocation information (set S), into the allocation type y.

The RB allocation information conversion availability check section 20 includes RB information converted from the allocation type x into the allocation type y in the RB allocation information (set S), and provides the allocation type y allocation section 10-y with RB allocation information (set S-set S') from which RB information incapable of being converted from the allocation type x into the allocation type y has been deleted.

Subsequently, the allocation type y allocation section 10-y allocates an unallocated RB of the RB allocation information (set S-set S') to the terminal station according to the allocation type y. Thereafter, likewise, the determination as to whether the conversion into another allocation type is possible and the conversion of an allocation type are repeated.

Next, several examples according to this embodiment will be described.

EXAMPLE 1

Figure 3:
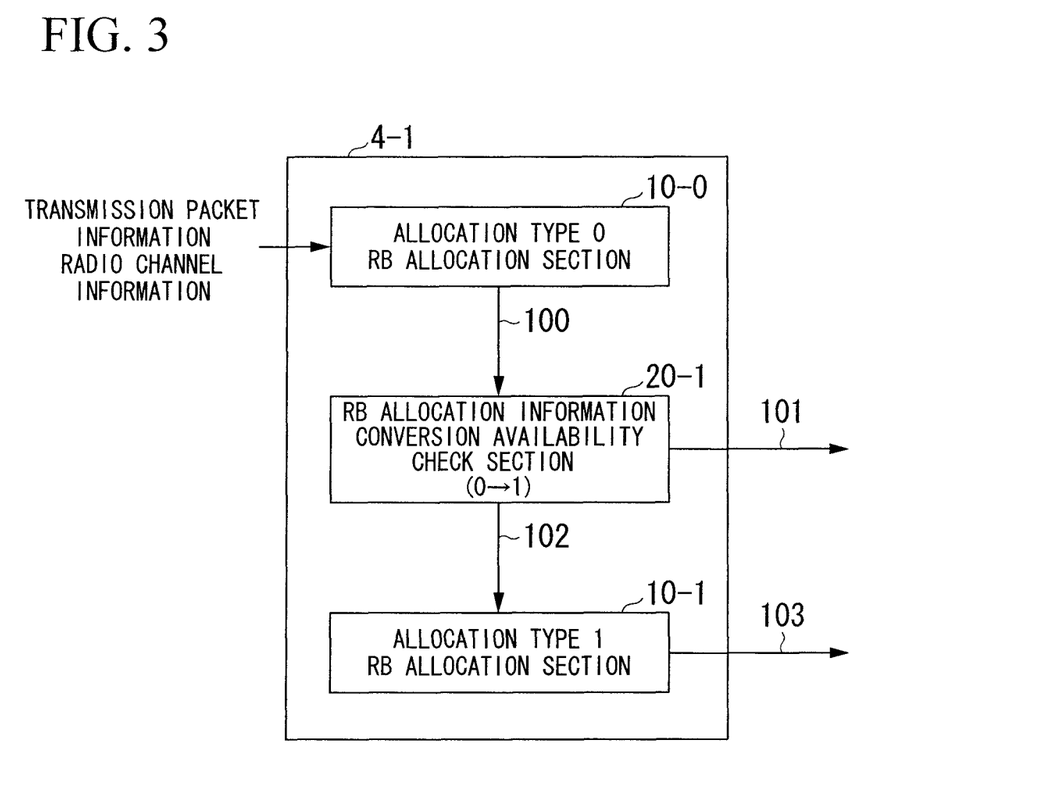
FIG. 3 is an example 1 of the radio frame control section 4 shown in FIG. 1.

FIG. 3 is an example 1 of the radio frame control section 4 shown in FIG. 1 (a radio frame control section 4-1). In FIG. 3, the radio frame control section 4-1 has an RB allocation section ("allocation type 0 allocation section") 10-0 for the allocation type 0, an RB allocation section ("allocation type 1 allocation section") 10-1 for the allocation type 1, and an RB allocation information conversion availability check section 20-1.

The allocation type 0 allocation section 10-0 performs RB allocation for the terminal station according to the allocation type 0. The allocation type 0 allocation section 10-0 provides the RB allocation information conversion availability check section 20-1 with RB allocation information 100 including the allocation result.

The RB allocation information conversion availability check section 20-1 determines whether or not the conversion is possible from allocation information of RBs allocated according to the allocation type 0 in the RB allocation information 100 into the allocation type 1, and converts RB allocation information of the allocation type 0 into the allocation type 1 when the conversion is possible. The RB allocation information conversion availability check section 20-1 extracts terminal station-related RB allocation information, incapable of being converted from allocation information of RBs allocated according to the allocation type 0 into the allocation type 1, from the RB allocation information 100, and outputs the extracted RB allocation information as RB allocation information 101. The RB allocation information 101 is configured from allocation information of RBs allocated according to the allocation type 0.

The RB allocation information conversion availability check section 20-1 includes RB information converted from the allocation type 0 into the allocation type 1 in the RB allocation information 100, and provides the allocation type 1 allocation section 10-1 with RB allocation information 102 from which RB information incapable of being converted from the allocation type 0 into the allocation type 1 has been deleted.

The allocation type 1 allocation section 10-1 allocates an unallocated RB of the RB allocation information 102 to the terminal station according to the allocation type 1. The allocation type 1 allocation section 10-1 outputs RB allocation information 103 including the allocation result.

Figure 4:
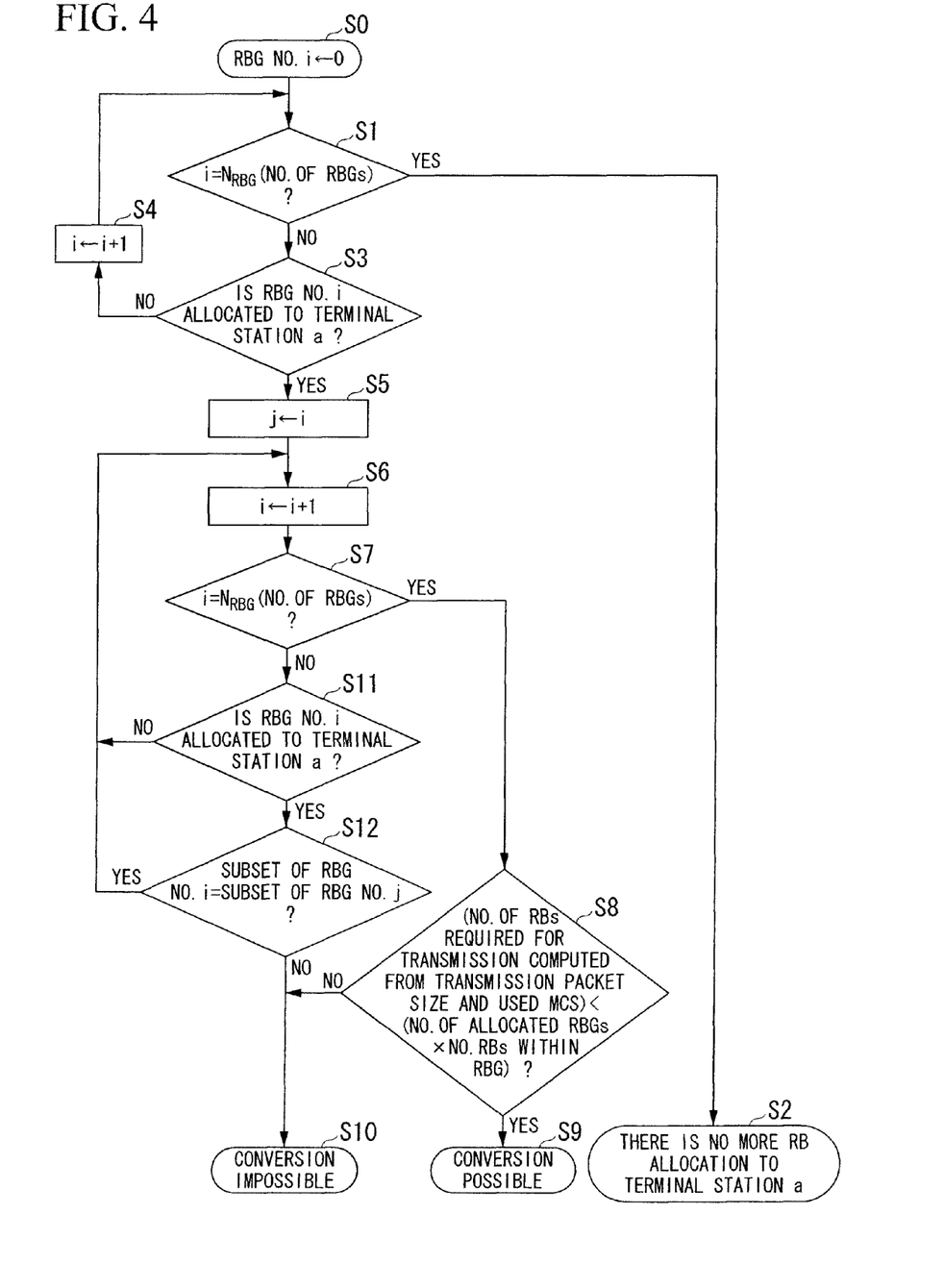
FIG. 4 is a flowchart of an RB allocation information conversion availability determination process related to an RB allocation information conversion availability check section 20-1 shown in FIG. 3.

FIG. 4 is a flowchart of an RB allocation information conversion availability determination process related to the RB allocation information conversion availability check section 20-1 shown in FIG. 3. In FIG. 4, the RB allocation information conversion availability check section 20-1 determines whether or not allocation information of RBs allocated according to the allocation type 0 is capable of being converted into the allocation type 1 for every terminal station. Here, a terminal station of a determination target is assumed to be the "terminal station a".

First, in step S0, a parameter i corresponding to an RBG number for identifying a resource block group (RBG) is initialized to 0 (corresponding to RBG No. "0"). In step S1, it is determined whether or not the parameter i matches the number of RBGs "$N_{RBG}$". When the parameter i matches the number of RBGs "$N_{RBG}$" as the result thereof, the process proceeds to step S2 in which it is determined that there is no more RB allocation by the allocation type 0 for the terminal station a.

When the parameter i does not match the number of RBGs "$N_{RBG}$" as the result of step S1, the process proceeds to step S3 in which it is determined whether or not RBG No. i is allocated to the terminal station a. When RBG No. i is not allocated to the terminal station a as the result thereof, the process proceeds to step S4 in which 1 is added to the parameter i. Then, the process returns to step S1.

When RBG No. i is allocated to the terminal station a as the result of step S3, the process proceeds to step S5 in which a value of the parameter i is substituted into a parameter j. Subsequently, 1 is added to the parameter i in step S6.

Subsequently, in step S7, it is determined whether or not the parameter i matches the number of RBGs "$N_{RBG}$". When the parameter i matches the number of RBGs "$N_{RBG}$" as the result thereof, the process proceeds to step S8. In step S8, the number of RBs required for transmission (the required number of RBs) computed from a transmission packet size and a used MCS (Modulation and Coding Scheme) for the terminal station a is compared with the total number of RBs of RBGs allocated in the allocation type 0 (Number of RBGs×Number of RBs within RBG). When the total number of RBs of the RBGs allocated in the allocation type 0 is greater than the required number of RBs as the result thereof, the process proceeds to step S9 in which it is determined that allocation information of RBs allocated according to the allocation type 0 for the terminal station a is capable of being converted into the allocation type 1. The MCS indicates a combination of a modulation scheme, a coding rate, and spatial multiplexing.

On the other hand, when the total number of RBs of the RBGs allocated in the allocation type 0 is equal to or less than the required number of RBs as the result of step S8, the process proceeds to step S10 in which it is determined that the allocation information of RBs allocated according to the allocation type 0 for the terminal station a is incapable of being converted into the allocation type 1.

When the parameter i does not match the number of RBGs "$N_{RBG}$" as the result of step S7, the process proceeds to step S11 in which it is determined whether or not RBG No. i is allocated to the terminal station a. When RBG No. i is not allocated to the terminal station a as the result thereof, the process returns to step S6.

When RBG No. i is allocated to the terminal station a as the result of step S11, the process proceeds to step S12. In step S12, it is determined whether or not a subset to which RBG No. i belongs is the same as that to which RBG No. j belongs. When the subsets are identical as the result thereof, the process returns to step S6. On the other hand, when the subsets are different, the process proceeds to step S10 in which it is determined that allocation information of the RB allocated according to the allocation type 0 for the terminal station a is incapable of being converted into the allocation type 1.

Figure 5:
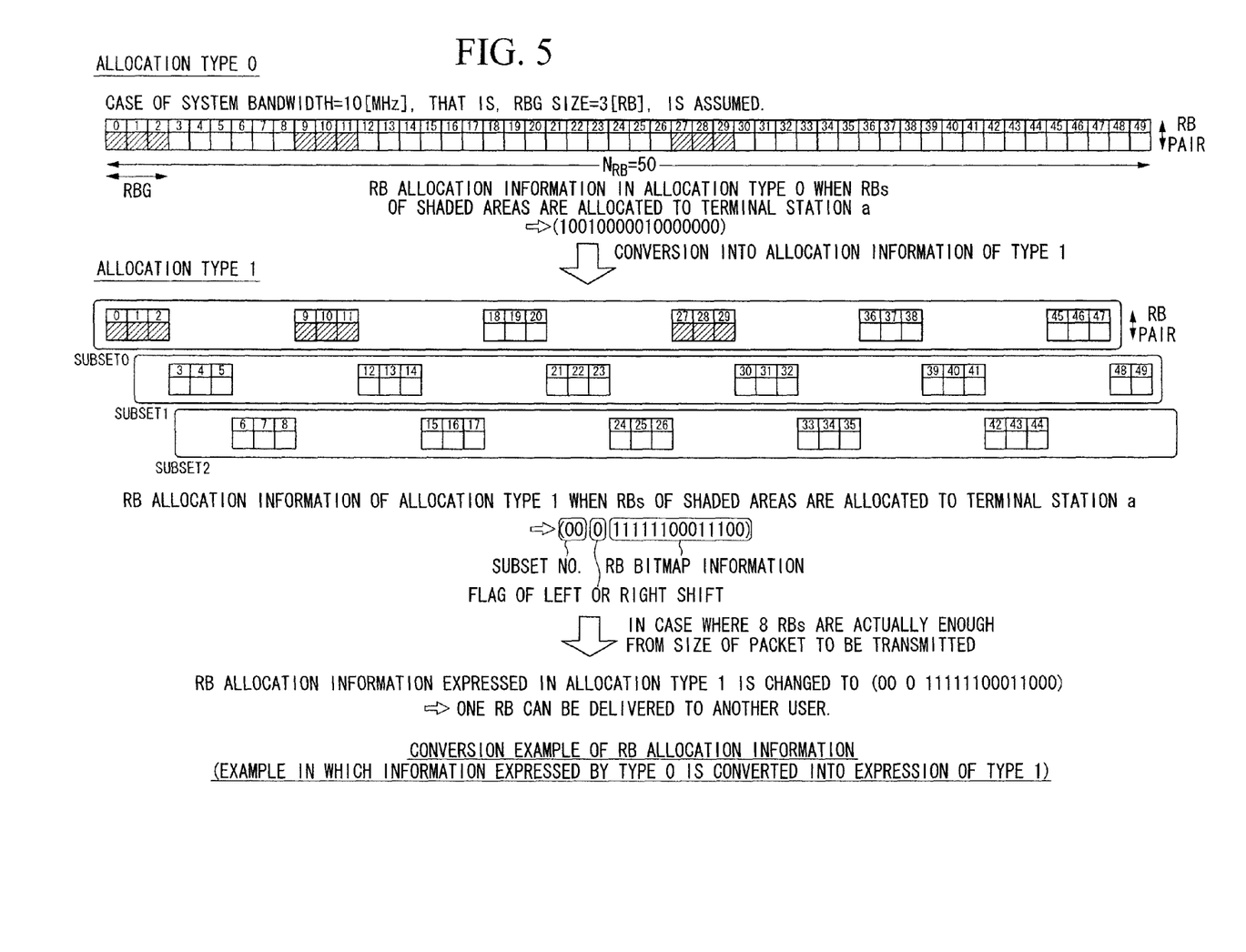
FIG. 5 is an example of converting RB allocation information according to the example 1.

FIG. 5 is an example of converting RB allocation information according to the example 1. In this example, the RBG size (the number of subsets) is 3. In FIG. 5, in the allocation type 0, first, three RBGs (an RBG of RB Nos. 0 to 2, an RBG of RB Nos. 9 to 11, and an RBG of RB Nos. 27 to 29) are allocated to the terminal station a. All the three RBGs belong to subset No. 0. Allocation information of RBs allocated according to the allocation type 0 for the terminal station a is capable of being converted into the allocation type 1. Thereby, the three RBGs (the RBG of RB Nos. 0 to 2, the RBG of RB Nos. 9 to 11, and the RBG of RB Nos. 27 to 29) allocated in the allocation type 0 for the terminal station a are converted into RB allocation information of the allocation type 1. In addition, the required number of RBs for the terminal station a is checked. When redundancy exists in the total number of RBs of the three RBGs (9 RBs), a redundant RB is released from the allocation for the terminal station a. Thereby, the redundant RB is capable of being allocated to another terminal station, so that the efficiency of frequency use can be improved.

According to this example 1, first, RBs are allocated to the terminal station in the allocation type 0. Thereafter, the conversion from the allocation type 0 into the allocation type 1 is attempted. Thereby, since a redundant RB in the allocation type 1 can be released for the terminal station to which an unnecessary RB has been allocated in the allocation type 0 and RB allocation can be efficiently performed, the efficiency of frequency use can be improved. A frequency band having a good wireless environment for the terminal station can be continuously allocated by first applying the allocation type 0. That is, in this example 1, an operation of continuously allocating a frequency band having a good wireless environment for the terminal station is set as a first RB allocation condition. Subsequently, an operation of improving the efficiency of frequency use by making a change to the allocation type 1 for a terminal station capable of being changed to the allocation type 1 while maintaining the first allocation condition is set as a second RB allocation condition.

EXAMPLE 2

Figure 6:
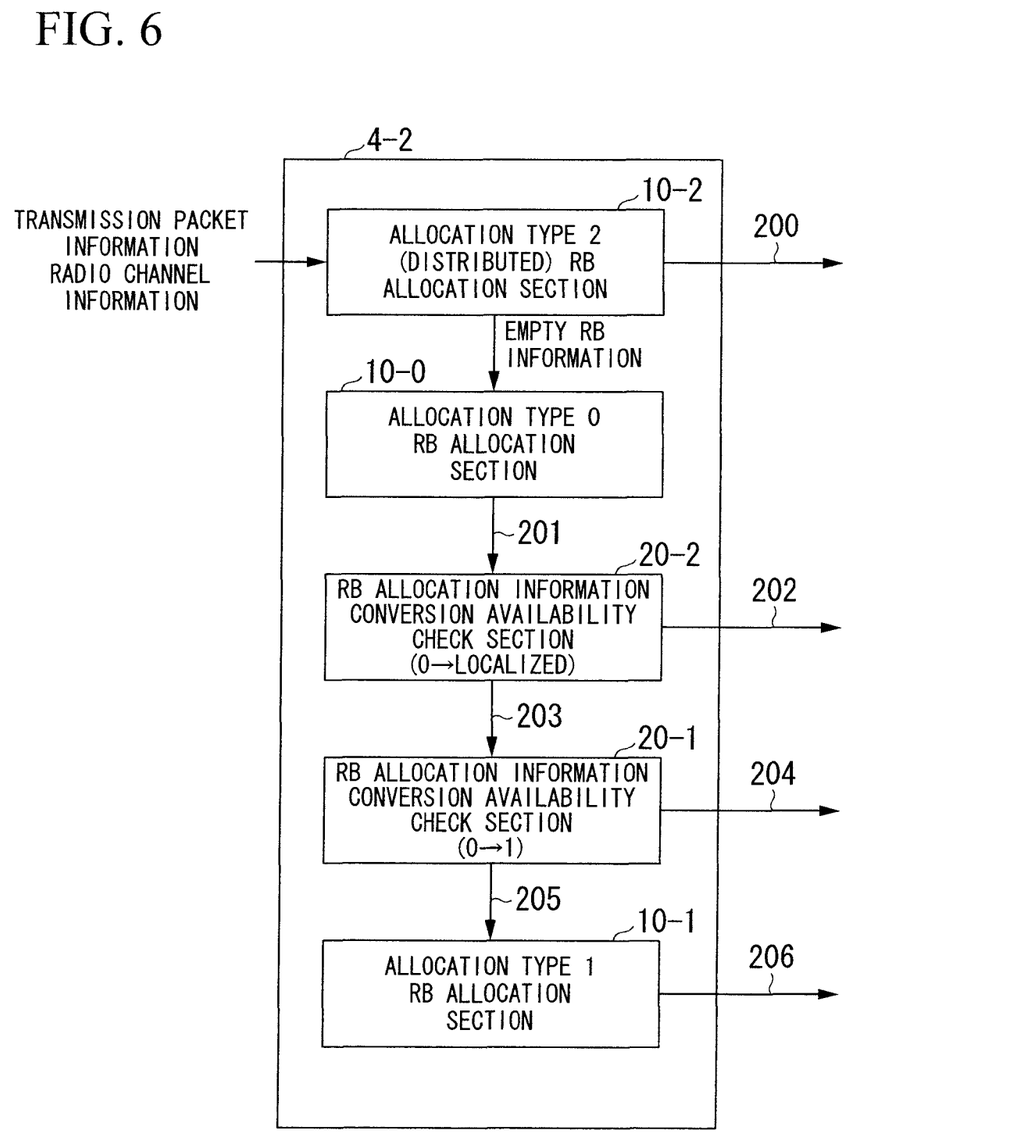
FIG. 6 is an example 2 of the radio frame control section 4 shown in FIG. 1.

FIG. 6 is an example 2 of the radio frame control section 4 shown in FIG. 1 (a radio frame control section 4-2). In FIG. 6, parts corresponding to those of FIG. 3 of the example 1 are denoted by the same reference numerals.

In FIG. 6, the radio frame control section 4-2 has an RB allocation section ("allocation type 0 allocation section") 10-0 for the allocation type 0, an RB allocation section ("allocation type 1 allocation section") 10-1 for the allocation type 1, an RB allocation section ("allocation type 2 (distributed) allocation section") 10-2 for the allocation type 2 (distributed), and RB allocation information conversion availability check sections 20-1 and 20-2.

The allocation type 2 (distributed) allocation section 10-2 performs RB allocation to the terminal station according to the allocation type 2 (distributed). The RB allocation type 2 (distributed) allocation section 10-2 outputs RB allocation information 200 as the allocation result. The RB allocation information 200 is configured from RB allocation information allocated according to the allocation type 2 (distributed). The allocation type 2 (distributed) allocation section 10-2 provides the allocation type 0 allocation section 10-0 with unallocated RB information (empty RB information) after RB allocation by the allocation type 2 (distributed).

The allocation type 0 allocation section 10-0 performs RB allocation to the terminal station according to the allocation type 0 on the basis of the empty RB information. The allocation type 0 allocation section 10-0 provides the RB allocation information conversion availability check section 20-2 with RB allocation information 201 including the allocation result.

The RB allocation information conversion availability check section 20-2 determines whether or not the conversion is possible from allocation information of RBs allocated according to the allocation type 0 in the RB allocation information 201 into the allocation type 2 (localized), and converts the RB allocation information of the allocation type 0 into the allocation type 2 (localized) when the conversion is possible. The RB allocation information conversion availability check section 20-2 extracts RB information, converted from the allocation type 0 into the allocation type 2 (localized), from the RB allocation information 201, and outputs the extracted RB information as RB allocation information 202. The RB allocation information 202 is configured from allocation information of RBs allocated according to the allocation type 2.

The RB allocation information conversion availability check section 20-2 provides the RB allocation information conversion availability check section 20-1 with RB allocation information 203 in which the RB information converted from the allocation type 0 to the allocation type 2 (localized) has been deleted from the RB allocation information 201.

The RB allocation information conversion availability check section 20-1 determines whether or not the conversion is possible from allocation information of RBs allocated according to the allocation type 0 in the RB allocation information 203 into the allocation type 1, and converts RB allocation information of the allocation type 0 into the allocation type 1 when the conversion is possible. The RB allocation information conversion availability check section 20-1 extracts terminal station-related RB allocation information, incapable of being converted from allocation information of RBs allocated according to the allocation type 0 into the allocation type 1, from the RB allocation information 203, and outputs the extracted RB allocation information as RB allocation information 204. The RB allocation information 204 is configured from allocation information of RBs allocated according to the allocation type 0.

The RB allocation information conversion availability check section 20-1 includes RB information converted from the allocation type 0 into the allocation type 1 in the RB allocation information 203, and provides the allocation type 1 allocation section 10-1 with RB allocation information 205 from which RB information incapable of being converted from the allocation type 0 into the allocation type 1 has been deleted. An RB allocation information conversion availability determination process related to the RB allocation information conversion availability check section 20-1 is the same as that of FIG. 4.

The allocation type 1 allocation section 10-1 allocates an unallocated RB of the RB allocation information 205 to the terminal station according to the allocation type 1. The allocation type 1 allocation section 10-1 outputs RB allocation information 206 including the allocation result.

Figure 7:
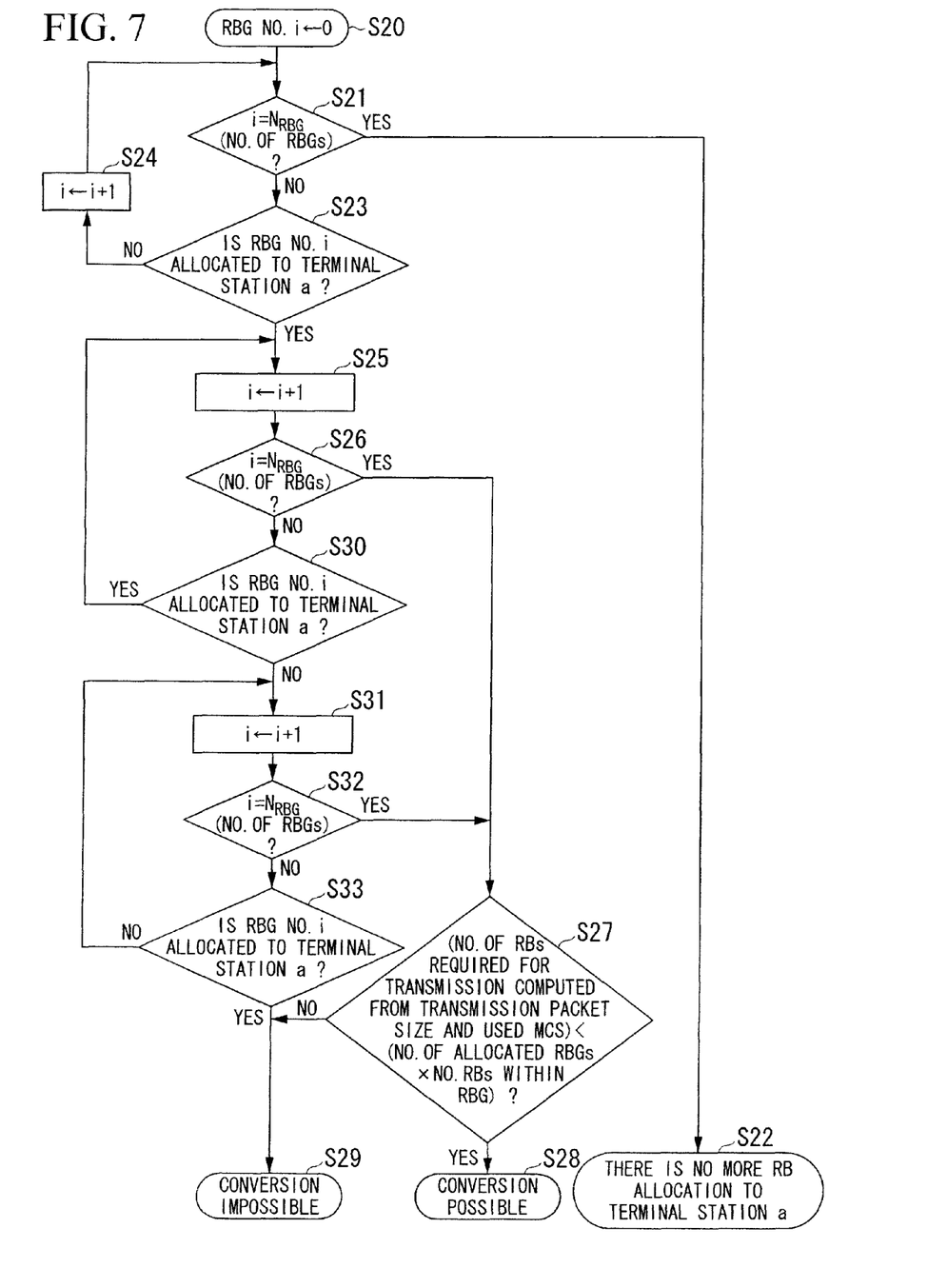
FIG. 7 is a flowchart of an RB allocation information conversion availability determination process related to an RB allocation information conversion availability check section 20-2 shown in FIG. 6.

FIG. 7 is a flowchart of an RB allocation information conversion availability determination process related to the RB allocation information conversion availability check section 20-2 shown in FIG. 6. In FIG. 7, the RB allocation information conversion availability check section 20-2 determines whether or not allocation information of RBs allocated according to the allocation type 0 is capable of being converted into the allocation type 2 (localized) for every terminal station. Here, a terminal station of a determination target is assumed to be the "terminal station a".

First, in step S20, a parameter i corresponding to an RBG number for identifying an RBG is initialized to 0 (corresponding to RBG No. "0"). In step S21, it is determined whether or not the parameter i matches the number of RBGs "$N_{RBG}$". When the parameter i matches the number of RBGs "$N_{RBG}$" as the result thereof, the process proceeds to step S22 in which it is determined that there is no more RB allocation by the allocation type 0 for the terminal station a.

When the parameter i does not match the number of RBGs "$N_{RBG}$" as the result of step S21, the process proceeds to step S23 in which it is determined whether or not RBG No. i is allocated to the terminal station a. When RBG No. i is not allocated to the terminal station a as the result thereof, the process proceeds to step S24 in which 1 is added to the parameter i. Then, the process returns to step S21.

When RBG No. i is allocated to the terminal station a as the result of step S23, the process proceeds to step S25 in which 1 is added to the parameter i.

Subsequently, in step S26, it is determined whether or not the parameter i matches the number of RBGs "$N_{RBG}$". When the parameter i matches the number of RBGs "$N_{RBG}$" as the result thereof, the process proceeds to step S27. In step S27, the number of RBs required for transmission (the required number of RBs) computed from a transmission packet size and a used MCS for the terminal station a is compared with the total number of RBs of RBGs allocated in the allocation type 0 (Number of RBGs×Number of RBs within RBG). When the total number of RBs of the RBGs allocated in the allocation type 0 is greater than the required number of RBs as the result thereof, the process proceeds to step S28 in which it is determined that allocation information of RBs allocated according to the allocation type 0 for the terminal station a is capable of being converted into the allocation type 2 (localized).

On the other hand, when the total number of RBs of the RBGs allocated in the allocation type 0 is equal to or less than the required number of RBs as the result of step S27, the process proceeds to step S29 in which it is determined that the allocation information of RBs allocated according to the allocation type 0 for the terminal station a is incapable of being converted into the allocation type 2 (localized).

When the parameter i does not match the number of RBGs "$N_{RBG}$" as the result of step S26, the process proceeds to step S30 in which it is determined whether or not RBG No. i is allocated to the terminal station a. When RBG No. i is allocated to the terminal station a as the result thereof, the process returns to step S25.

When RBG No. i is not allocated to the terminal station a as the result of step S30, the process proceeds to step S31 in which 1 is added to the parameter i.

Subsequently, in step S32, it is determined whether or not the parameter i matches the number of RBGs "$N_{RBG}$". When the parameter i matches the number of RBGs "$N_{RBG}$" as the result thereof, the process proceeds to step S27 in which it is determined whether or not allocation information of RBs allocated according to the allocation type 0 is capable of being converted into the allocation type 2 (localized) for the terminal station a according to the above-described method.

When the parameter i does not match the number of RBGs "$N_{RBG}$" as the result of step S32, the process proceeds to step S33 in which it is determined whether or not RBG No. i is allocated to the terminal station a. When RBG No. i is not allocated to terminal station a as the result thereof, the process returns to step S31.

When RBG No. i is allocated to the terminal station a as the result of step S33, the process proceeds to step S29 in which it is determined that the allocation information of RBs allocated according to the allocation type 0 is incapable of being converted into the allocation type 2 (localized) for the terminal station a. On the other hand, when RBG No. i is not allocated to the terminal station a as the result of step S33, the process returns to step S31.

According to this example 2, first, RBs are allocated to the terminal station in the allocation type 2 (distributed). Thereafter, in unallocated RBs, an RB is allocated to the terminal station in the allocation type 0. Then, the conversion from the allocation type 0 into the allocation type 2 (localized) or the allocation type 1 is attempted. Thereby, a redundant RB in the allocation type 2 (localized) or the allocation type 1 is released for the terminal station to which an unnecessary RB has been allocated by the allocation type 0 and RB allocation can be efficiently performed, so that the efficiency of frequency use can be improved. The conversion from the allocation type 0 into the allocation type 2 (localized) is first attempted, so that a continuous frequency band with a good wireless environment for a terminal station secured in the allocation type 0 can be easily maintained.

Since an allocation type is variable when RBs are allocated to a terminal station according to this embodiment as described above, the degree of freedom of RB allocation is large and RB allocation adapted to frequency characteristics or the like by a traffic pattern or multipath can be performed.

Thereby, RB waste can be prevented and the efficiency of frequency use can be improved.

The embodiment of the present invention has been described in detail with reference to the drawings. However, specific configurations are not limited to the embodiment and may include any design change within the scope of the present invention without departing from the subject matter.

According to the present invention, the efficiency of frequency use can be improved when resource blocks are allocated to a terminal station using any one of a plurality of resource block allocation methods respectively having different restrictions for a downlink radio frame of an OFDMA scheme.

It is apparent that the present invention is not limited to the above embodiments, but may be modified and changed without departing from the scope and spirit of the invention.

What is claimed is:

1. A radio frame control device, comprising:
   a controlling unit which controls a downlink radio frame of an orthogonal frequency division multiple access scheme;

a resource block allocation unit which allocates resource blocks to a terminal station using a first resource block allocation method from among a plurality of resource block allocation methods respectively having different restrictions; and a resource block conversion unit which determines whether or not conversion of allocation information of resource blocks allocated according to the first resource block allocation method into resource block allocation information by a second resource block allocation method is possible, wherein the conversion is determined to be possible if the allocation information of resource blocks allocated according to the first resource block allocation method has a restriction on the second resource block allocation method and if an unallocated resource block of the resource block allocation information by the second resource block allocation method is allocated to the terminal station according to the second resource block allocation method, and when the conversion is possible, the resource block conversion unit converts the resource block allocation method for the resource block allocation information, whereas when the conversion is impossible, the resource block conversion unit outputs the resource block allocation information configured from allocation information of resource blocks allocated according to the first resource block allocation method.

2. The radio frame control device according to claim 1, wherein the first resource block allocation method allocates resource blocks to the terminal station in a unit of a resource block group configured from a plurality of resource blocks continuous on a frequency axis, and the second resource block allocation method allocates resource blocks to the terminal station in a resource block unit for the same subset among a plurality of subsets in which resource blocks are sequentially arranged in the resource block group unit.

3. The radio frame control device according to claim 1, wherein the first resource block allocation method allocates resource blocks to the terminal station in a unit of a resource block group configured from a plurality of resource blocks continuous on a frequency axis, and the second resource block allocation method allocates resource blocks continuous on the frequency axis to the terminal station in a resource block unit on a logical frequency axis coincident with a physical frequency axis.

4. The radio frame control device according to claim 1, wherein the resource block allocation unit allocates resource blocks to every destination terminal station on the basis of a packet amount accumulated in a packet buffer and each packet size.

5. The radio frame control device according to claim 1, wherein the resource block allocation unit allocates resource blocks on the basis of a downlink radio channel state.

6. A radio communication device of an orthogonal frequency division multiple access scheme, comprising;
a radio frame control device according to claim 1; and
an OFDMA transmitting unit which arranges a transmission packet addressed to each terminal station for resource blocks within a radio frame according to resource block allocation information for each terminal station determined by the radio frame control device.

7. A radio frame control method, comprising:
controlling a downlink radio frame of an orthogonal frequency division multiple access scheme;

allocating resource blocks to a terminal station using a first resource block allocation method from among a plurality of resource block allocation methods respectively having different restrictions;

determining whether or not conversion of allocation information of resource blocks allocated according to the first resource block allocation method into resource block allocation information by a second resource block allocation method is possible, wherein the conversion is determined to be possible if the allocation information of resource blocks allocated according to the first resource block allocation method has a restriction on the second resource block allocation method and if an unallocated resource block of the resource block allocation information by the second resource block allocation method is allocated to the terminal station according to the second resource block allocation method; and when the conversion is possible, converting the resource block allocation method for the resource block allocation information, whereas when the conversion is impossible, the resource block conversion unit outputs the resource block allocation information configured from allocation information of resource blocks allocated according to the first resource block allocation method.

8. The radio frame control method according to claim 7, further comprising allocating second resource block to the terminal station using the second resource block allocation method for the result of resource block allocation by the converting the resource block allocation method.

9. The radio frame control method according to claim 7, wherein when the conversion into the resource block allocation information by the second resource block allocation method is impossible, the radio frame control method determines whether or not conversion of the resource block allocation to the terminal station into resource block allocation by a third resource block allocation method and release of redundant resource blocks are possible.

10. A radio frame control device, comprising:
a controlling unit which controls a downlink radio frame of an orthogonal frequency division multiple access scheme;

a resource block allocation unit which allocates resource blocks to a terminal station using a first resource block allocation method from among a plurality of resource block allocation methods respectively having different restrictions; and a resource block conversion unit which determines whether or not conversion of allocation information of resource blocks allocated according to the first resource block allocation method into resource block allocation information by a second resource block allocation method so as to release redundant resource blocks included in the resource blocks allocated according to the first resource block allocation method is possible, wherein the conversion is determined to be possible if the allocation information of resource blocks allocated according to the first resource block allocation method has a restriction on the second resource block allocation and if an unallocated resource block of the resource block allocation information by the second resource block allocation method is allocated to the terminal station according to the second resource block allocation method, and when the conversion and the release is possible, the resource block conversion unit converts the resource block allocation method for the resource block allocation information, whereas when the conversion is impossible, the resource block conversion unit outputs the resource block allocation information configured from allocation information of resource blocks allocated according to the first resource block allocation method.

* * * * *